(12) United States Patent
Watson

(10) Patent No.: US 12,160,102 B1
(45) Date of Patent: Dec. 3, 2024

(54) ENERGY STORAGE SYSTEM

(71) Applicant: Timothy Dean Watson, Indianapolis, IN (US)

(72) Inventor: Timothy Dean Watson, Indianapolis, IN (US)

( * ) Notice: Subject to any disclaimer, the term of this patent is extended or adjusted under 35 U.S.C. 154(b) by 0 days.

(21) Appl. No.: 18/482,367

(22) Filed: Oct. 6, 2023

Related U.S. Application Data

(60) Provisional application No. 63/413,707, filed on Oct. 6, 2022.

(51) Int. Cl.
*H02J 15/00* (2006.01)
*F01K 25/10* (2006.01)
*H02K 15/00* (2006.01)

(52) U.S. Cl.
CPC ............ *H02J 15/003* (2013.01); *H02J 15/00* (2013.01); *F01K 25/103* (2013.01); *H02K 15/0062* (2013.01); *Y02E 60/16* (2013.01)

(58) Field of Classification Search
CPC ....... H02J 15/003; F01K 25/103; Y02E 60/16
See application file for complete search history.

(56) References Cited

U.S. PATENT DOCUMENTS

| | | | |
|---|---|---|---|
| 2007/0163261 A1* | 7/2007 | Strathman | F01K 23/18 60/659 |
| 2017/0082123 A1* | 3/2017 | Momen | F01K 7/00 |
| 2017/0122670 A1* | 5/2017 | Ahlbom | B01D 5/0027 |
| 2022/0047987 A1* | 2/2022 | Lee | B01D 53/1425 |

FOREIGN PATENT DOCUMENTS

| | | |
|---|---|---|
| WO | WO 2021/191786 | 9/2021 |
| WO | WO 2021/255578 | 12/2021 |
| WO | WO 2022/064533 | 3/2022 |

OTHER PUBLICATIONS

Energy Dome Scores First Licensing Agreement for $CO_2$, retrieved on Mar. 26, 2024 from https://www.energy-storage.news/energy-dome-scores-first-licensing-agreement-for-co2-battery/, 5 pages.

(Continued)

*Primary Examiner* — Michael C Zarroli
(74) *Attorney, Agent, or Firm* — Bose McKinney & Evans LLP

(57) ABSTRACT

An energy storage system for use with renewable electrical sources. Illustratively, the system includes a pumped glycerol battery (PGB) which is a mechanical system designed to store renewable electricity in a manner that can be readily dispensed back into the national electrical power grid or smaller grid systems on demand. The energy is illustratively stored in three additive forms of potential energy—(1) gravitational, (2) high-pressure gas derived by phase-change, and (3) vacuum draw. The primary working fluid medium (that which propels a turbine-generator to create electricity) is illustratively a dense liquid material that will be physically elevated at its energy storage site. The secondary working medium (that which assists the primary medium by adding more stored energy) is a gas, such as carbon dioxide.

20 Claims, 2 Drawing Sheets

(56) References Cited

OTHER PUBLICATIONS

Instant Long Duration Energy Storage: Just Add Carbon Dioxide, retrieved on Mar. 26, 2024 from https://cleantechnica.com/2022/04/22/instant-long-duration-energy-storage-just-add-carbon-dioxide/, 12 pages.

The World's First $CO_2$ Battery for Long-Duration Energy Storage is being Commercialized, retrieved on Mar. 26, 2024 from https://electrek.co/2022/06/28/worlds-first-co2-battery/, 5 pages.

New CO2 Battery will make Wind and Solar Dispatchable 'at an unprecedented low price', retrieved on Mar. 26, 2024 from https://www.rechargenews.com/energy-transition/new-co2-battery-will-make-wind-and-solar-dispatchable-at-an-unprecedented-low-price/2-1-1044755?zephr_sso_ott=FOHDnj[Mar. 26, 2024 4:37:11 PM], 9 pages.

The 'Sleeping Giant of Energy Storage' is Waking up, retrieved on Mar. 26, 2024 from https://www.forbes.com/sites/jeffmcmahon/2022/12/29/the-sleeping-giant-of-energy-storage-is-waking-up/?sh=634c7f6315f8, 4 pages.

This Company wants to use Carbon Dioxide to Store Renewable Power on the Grid, retrieved on Mar. 26, 2024 from https://www.technologyreview.com/2022/05/03/1051644/carbon-dioxide-storage-energy-dome/, 6 pages.

\* cited by examiner

ENERGY STORAGE SYSTEM

This application claims priority to U.S. Provisional Patent Application Ser. No. 63/413,707, filed Oct. 6, 2022, the disclosure of which is expressly incorporated herein by reference.

BACKGROUND AND SUMMARY OF THE INVENTION

The present disclosure relates generally to energy storage systems and, more particularly, to such a system including a pumped glycerol battery for storing energy from renewable electricity sources.

The storage of energy from renewable electrical sources may be achieved by various methods using, for example, chemical, gravitational, thermal, electrical, and mechanical devices. One common method for utility scale energy storage is so-called "Pumped Storage Hydropower" (PSH). In this method, water is pumped upward against gravity to a reservoir for storage until electrical energy is needed in the electrical power grid ("The Grid"). Pumped Storage Hydropower is commonly considered the preferred method for longest duration energy delivery at utility scale.

The energy storage system of the present disclosure detailed herein illustratively includes a pumped working fluid battery and, more particularly, a pumped glycerol battery (PGB). The illustrative pumped glycerol battery utilizes glycerol (aka: glycerin or glycerine) as the "working fluid" component. However, the PGB system of the present disclosure is not limited to only glycerol and may work as well or better with other fluids not yet tested or to be specially designed. Given that the illustrative PGB system is economically viable and is also safe for the planet and mankind, this system could function in many ways like pumped storage hydropower but without its limitations of geography, environmental impact, and cost. The PGB system could also be scaled down for smaller individual projects, but it is primarily intended to provide utility scale storage for the surplus electricity provided by renewable electrical sources, such as wind and/or solar generation.

Illustratively, the energy storage system includes a pumped glycerol battery (PGB) which is a mechanical system designed to store renewable electricity in a manner that can be readily dispensed back into the national electrical power grid or smaller grid systems on demand. The energy is illustratively stored in three additive forms of potential energy—(1) gravitational, (2) high-pressure gas derived by phase-change, and (3) vacuum draw. The primary working fluid medium (that which propels a turbine-generator to create electricity) is illustratively a dense liquid material that will be physically elevated at its energy storage site. The secondary working medium (that which assists the primary medium by adding more stored energy) is a gas, such as carbon dioxide.

Various pipes, pumps, valves, and controlling equipment complete the basic energy storage system which is envisioned as efficiently storing low-cost surplus electricity at utility scale but may also prove workable at a smaller scale in more isolated cases. The primary medium selected for use may have properties much like standard hydraulic fluids, but may be further developed in its formulation through continuous product research. In all, it is expected that a utility scale PGB system will provide longer-duration peaking/emergency power that is more cost effective and less risky than Lithium-ion battery farms or other storage systems currently available or under development.

According to an illustrative embodiment of the present disclosure, an energy storage system includes a supply vessel having a first portion receiving a pressurized carbon dioxide, and a second portion receiving a working fluid. A receiving vessel is in fluid communication with the supply vessel. A turbine is positioned intermediate the supply vessel and the receiving vessel, wherein the working fluid passes through the turbine to generate electricity.

According to another illustrative embodiment of the present disclosure, a method of storing energy includes the steps of providing a supply vessel receiving a working fluid, flowing the working fluid through a turbine to generate electricity, using pressurized gas to push the working fluid from the supply vessel to the turbine, and providing a receiving vessel to receive the working fluid after flowing through the turbine.

Additional features and advantages of the present invention will become apparent of those skilled in the art upon consideration of the following detailed description of the illustrative embodiment exemplifying the best mode of carrying out the invention as presently perceived.

BRIEF DESCRIPTION OF THE DRAWINGS

A detailed description of the drawings particularly refers to the accompanying figures, in which.

DETAILED DESCRIPTION OF THE DRAWINGS

Figures 1, 1A:
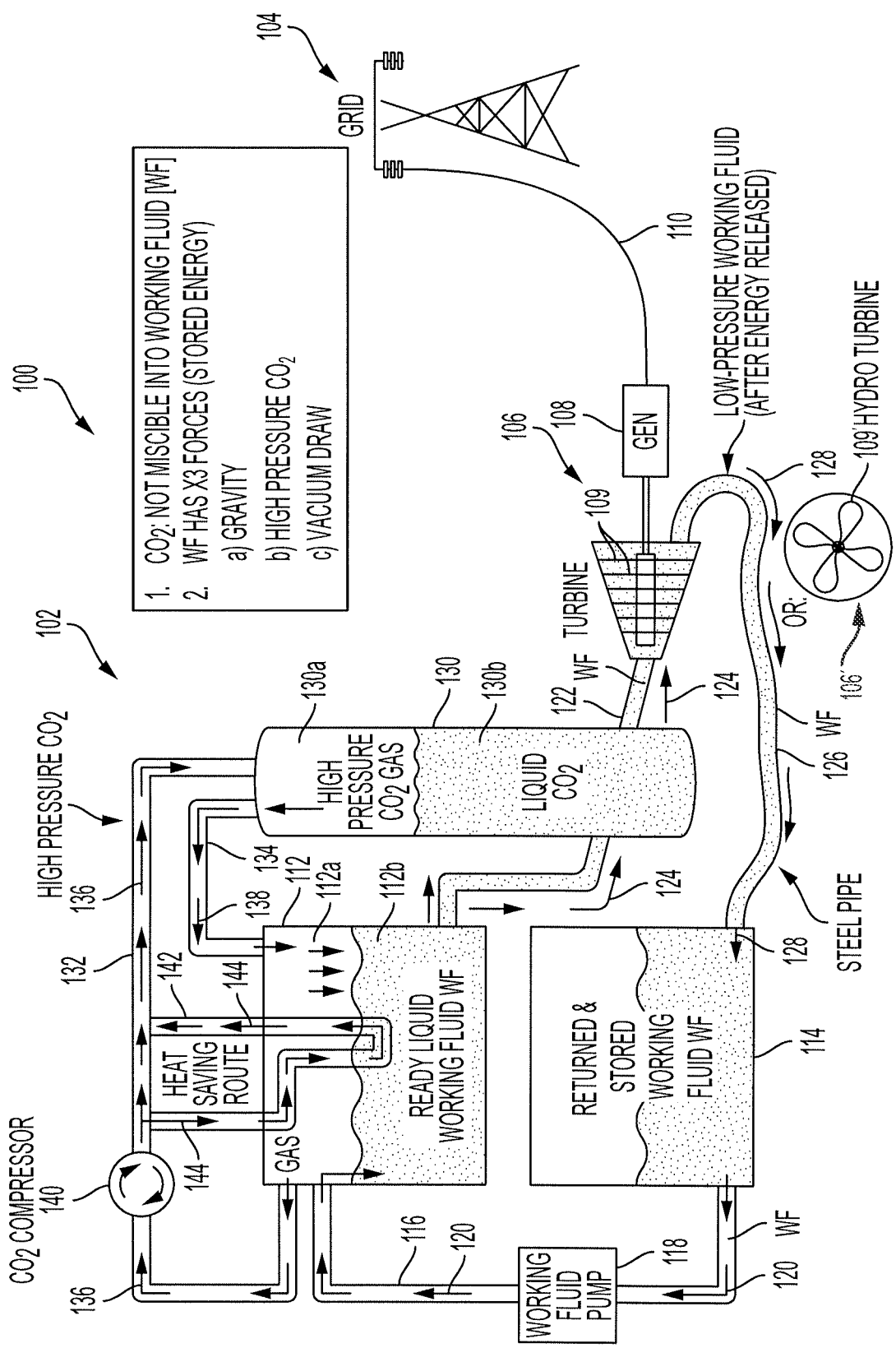
FIG. 1 is a schematic view of an illustrative embodiment energy storage system of the present disclosure, including a pumped glycerol battery.
FIG. 1A is a schematic end view of a further illustrative turbine of FIG. 1.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

With reference initially to FIG. 1, an illustrative energy storage system 100 is shown as including a working fluid battery, more particularly a pumped glycerol battery 102. The working fluid (WF) illustratively comprises a liquid, such as glycerol (aka: glycerin or glycerine). However, the energy storage system 100 of the present disclosure is not limited to only glycerol and may work as well or better with other working fluids not yet tested or to be specially designed. The pumped glycerol battery 102 is operably coupled to an electrical power grid (commonly referred to as the Grid) 104 via a conventional or specifically designed turbine 106, illustratively a working fluid turbine such as a Francis hydro turbine 106' (FIG. 1A). As is known, the turbine 106, 106' is operably coupled to a generator 108 for generating electricity in response to rotation of the vanes or impellers 109, 109' of the turbine 106, 106'. Conventional power lines 110 electrically couple the generator 108 to the power grid 104.

The pumped glycerol battery 102 illustratively includes a supply vessel, such as a first sealed vessel or upper storage tank 112 for storing the working fluid at elevation above a second sealed vessel or lower receiving tank 114. The upper storage tank 112 illustratively includes a first or upper portion 112a receiving a pressurized gas, such as pressurized carbon dioxide ($CO_2$) gas, and a second or lower portion 112b receiving the working fluid. An electric heater (not shown in FIG. 1) is illustratively supported by the upper storage tank 112 and is in thermal communication with the working fluid in the second portion 112b. The electric heater may be internal or external to the tank 112 and is configured to keep the working fluid at a desired temperature to maintain it in a liquid state. A fluid conduit 116 illustratively provides for fluid communication between the upper storage tank 112 and the lower receiving tank 114. Illustratively, a working fluid pump 118 is fluidly coupled to the fluid conduit 116 and is configured to pull the working fluid from the lower receiving tank 114 to the upper storage tank 112 (as represented by arrows 120).

The lower receiving tank 114 is configured to receive the working fluid after the working fluid has expended its gravitational energy through the turbine 106 to generate electricity. A fluid conduit 122 illustratively provides for fluid communication between the lower portion 112b of the upper storage tank 112 and the turbine 106, wherein the working fluid flows from the upper storage tank 112 and the turbine 106 (as represented by arrows 124). A fluid conduit 126 illustratively provides for fluid communication between the turbine 106 and the lower receiving tank 114, wherein the working fluid flows from the turbine 106 to the lower receiving tank 114 (as represented by arrows 128). A control valve 127 may be fluidly coupled to the fluid conduit 126 to control the rate of working fluid flow through the fluid conduit 126. When the working fluid flows in a first direction (e.g., from the upper storage tank 112 to the lower storage tank 114), the turbine 106 illustratively acts as a generator. When the working fluid flows in a second direction opposite the first direction (e.g., from the lower storage tank 114 to the upper storage tank 112), the turbine 106 illustratively acts as a pump.

While a single turbine 106 is shown in FIG. 1, it should be appreciated that a plurality or array of turbines 106 may be provided. Such an array of turbines 106 may be of any number, and arranged in parallel or series. Additionally, in order to be responsive to variations in the Grid 104, the turbine 106 may act as a leakable pump (i.e., change direction of flow without reversing the pump).

The illustrative energy storage system 100 may include various pumps, valves, sensing units and digital management or control units operably coupled to the first and second sealed vessels 112 and 114. A sealed pressure vessel 130 may receive a pressurized fluid. Illustratively, the pressure vessel 130 includes a first or upper portion 130a receiving a pressurized gas, such as high pressure carbon dioxide ($CO_2$) gas, and a second or lower portion 130b receiving a liquid, such as liquid $CO_2$. Illustratively, the pressurized, liquid carbon dioxide ($CO_2$) is designed to maintain a constant pressure on the working fluid (glycerol) during the energy discharge, so as to maximize toward steady and sufficient electrical output from the turbine-generator components 106, 108.

Fluid conduits 132 and 134 illustratively provide for fluid communication between the pressure vessel 130 and the upper storage tank 112. More particularly, high pressure $CO_2$ gas flows from the upper portion 112a of the first sealed vessel 112 to the upper portion 130a of the pressure vessel 130 (as represented by arrows 136) via the fluid conduit 132. Similarly, high pressure $CO_2$ gas flows from the upper portion 130a of the pressure vessel 130 to the upper portion 112a of the first sealed vessel 112 (as represented by arrows 138) via the fluid conduit 134. A compressor 140 may be fluidly coupled to the fluid conduit 132 to compress the $CO_2$ gas therein.

Illustratively an electric heater (not shown) may also be provided in thermal communication with the pressure vessel 130 to change the $CO_2$ from a liquid state to a gaseous state on demand. A fluid conduit loop 142 may be fluidly coupled to the fluid conduit 132 to provide a heat saving route for the $CO_2$ (as represented by arrows 144). Illustratively, various pipes and valves, sensing devices, and other control parts may be operably coupled to the pressure vessel 130. Various electrical components of the system 100 may be controlled by a controller 150 including a processor 152. In certain illustrative embodiments, the controller 150 may be in wireless communication with such electrical components (as represented by arcs 154).

During operation of the illustrative energy storage system 100, incoming (low-cost) electricity is used to pump the glycerol from the lower receiving tank 114 to the upper storage tank 112 to gain gravitational potential energy. Electricity from the electrical power grid 104 is also used to drive the turbine 106 and thereby pump working fluid back into the storage tank 114 via the fluid conduit 126. A minimal level of glycerol is to be retained in the lower portion 112b of the upper storage tank 112 in order to prevent the $CO_2$ from coursing through the turbine-generator components 106, 108 of the system 100. Pumping glycerol back into the lower portion 112b of the upper storage tank 112 will in part push the $CO_2$ back into the pressure vessel 130 via the fluid conduit 132 as the glycerol level rises (as represented by arrows 136), where it is to liquefy and await another cycle of energy discharge. The electrical compressor 140 is illustratively provided to further compress the $CO_2$ and regain its full phase change potential energy at the desired temperature. This compressor also minimizes the amount of $CO_2$ that will phase-change to liquid in the upper tank 112a.

While other battery systems have been proposed to store excess electrical energy by compressing $CO_2$ into a liquid, the pumped glycerol battery (PGB) 102 of the present disclosure utilizes the physical phase-change of $CO_2$ (liquid to gas) for a purpose other than for it to be the working fluid that drives the turbine 106 and attached generator 108. Liquid $CO_2$ can be self-regulated as a guarantor of constant pressure upon another liquid working fluid. Expansion of the space for the pressure-providing $CO_2$ above the working fluid (glycerol) will instantly drop the $CO_2$'s pressure and thusly cause more $CO_2$ to change phase from liquid to gas, thus maintaining the desired pressure against the glycerol fluid. Though this action is fast and unassisted, a controlled heater can also activate the change from liquid to gas for additional $CO_2$-pressure on the glycerol when needed. The whole system 102 is both closed (sealed) and space conserving, as the glycerol is much more energy dense and does not require a large external receiving bag, as found in other systems that must store their expanded $CO_2$ working fluid in a flexible low-pressure vessel until recompressed into high-pressure tanks for liquid energy storage.

Figure 2:
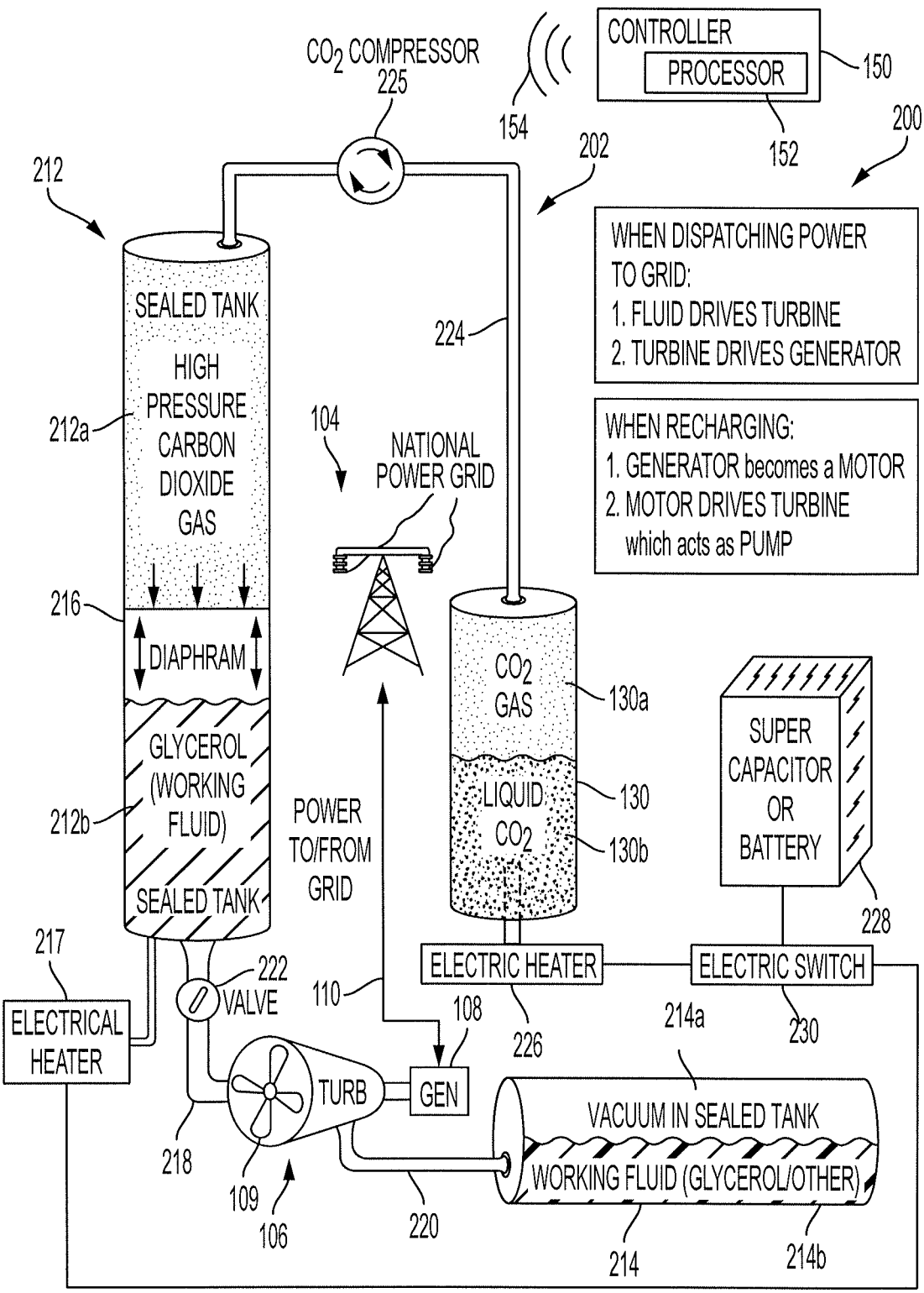
FIG. 2 is a schematic view of a further illustrative embodiment energy storage system of the present disclosure, including a pumped glycerol battery.

Referring now to FIG. 2, a further illustrative energy storage system 200 is shown as including a working fluid battery, more particularly includes a pumped glycerol battery (PGB) 202. The illustrative energy storage system 200 includes many similar elements as the energy storage system 100 detailed above. As such, in the following description similar components are identified with like reference numbers.

The illustrative energy storage system 200 includes sealed vessels 212 and 214 for holding a working fluid (WF), including a supply vessel, illustratively a first or upper storage tank 212 for storing the working fluid under pressure at elevation, and a second or lower storage tank 214 at a lower level for receiving the working fluid after the liquid has expended its gravity and gas-pressure-derived energy through the turbine 106 and the generator 108 that generates electricity. The working fluid (WF) illustratively comprises a liquid, such as glycerol (aka: glycerin or glycerine). Secondary to these vessels 212 and 214 are related pumps, pipes, valves, sensing units, and digital management units.

While a single turbine 106 is shown in FIG. 2, it should be appreciated that a plurality or array of turbines 106 may be provided. Such an array of turbines 106 may be of any number, and arranged in parallel or series.

The upper storage tank 212 illustratively includes a first or upper portion 212a receiving a pressurized gas, such as pressurized carbon dioxide ($CO_2$) gas, and a second or lower portion 212b receiving the working fluid. Illustratively, the first portion 212a and the second portion 212b are received within a single sealed storage tank 212. However, it should be appreciated that the first portion 212a and the second portion 212b may be defined by separate vessels or tanks. Illustratively, the first portion 212a is positioned above the second portion 212b, and a movable diaphragm 216 is positioned between the first portion 212a and the second portion 212b. The diaphragm 216 may be flexible and move in response to a pressure differential on opposing sides thereof (i.e., different pressures of the pressurized carbon dioxide ($CO_2$) gas in the first portion 212a, and the working fluid in the second portion 212b). In an illustrative embodiment, the diaphragm 216 may be formed of a thin membrane formed of a self-lubricated graphene.

An electric heater 217 is illustratively supported by the upper storage tank 212 and is in thermal communication with the working fluid in the second portion 212b. The electric heater 217 may be internal or external to the tank 212 and is configured to keep the working fluid at a desired temperature to maintain it in a liquid state. The electric heater 217 is illustratively coupled to the electric switch 230 and may be powered by a battery or a supercapacitor.

A fluid conduit 218 provides for fluid communication between the second portion 212b and the turbine 106, while a fluid conduit 220 provides for fluid communication between the turbine 106 and the storage tank 214. A control valve 222 may be fluidly coupled to the fluid conduit 218 to control the rate of working fluid flow through the fluid conduit 218.

The lower storage tank 214 is illustratively a sealed tank including a first or upper portion 214a receiving a vacuum, a second or lower portion 214b to receive the working fluid. The lower portion 214b is in fluid communication with the turbine 106 via the fluid conduit 220.

When the working fluid flows in a first direction (e.g., from the upper storage tank 212 to the lower storage tank 214), the turbine 106 illustratively acts as a generator. When the working fluid flows in a second direction opposite the first direction (e.g., from the lower storage tank 214 to the upper storage tank 212), the turbine 106 illustratively acts as a pump.

A sealed pressure vessel 130 illustratively receives $CO_2$ gas and, more particularly, supercritical carbon dioxide (SCD), which is designed to maintain a constant pressure on the working fluid (glycerol) in the second portion 212b of the storage tank 212 during energy discharge of the battery 202, so as to guarantee sufficient electrical output from the turbine-generator 106, 108. Illustratively, the vessel 130 includes a first or upper portion 130a receiving the $CO_2$ gas, and a second or lower portion 130b receiving supercritical $CO_2$ liquid. A fluid conduit 224 fluidly couples the first portion 130a of the vessel 130 to the first portion 212a of the storage tank 212. A compressor 225 may be fluidly coupled to the conduit 224 for removing $CO_2$ gas from upper tank 212a before it would phase-change within that tank 212a.

Ancillary equipment regarding the pressure tank 130 may include a compress $CO_2$ gas, an internal electric-heater unit, plus pipes and valves, and various control and containment parts. Illustratively, an electric heater 226 may be in thermal communication with the vessel 130 to heat the liquid $CO_2$ into a $CO_2$ gas. A supercapacitor or battery 228 powers the electric heater 226 and may be controlled by an electric switch 230.

When there is demand for the pumped glycerol battery (PGB) 202 to provide electricity to the Grid 104, the working fluid in the upper vessel 212 (tank 1) is released at the bottom to the turbine-generator 106, 108 and then onward to the receiving vessel 214 (tank 2) below. The force of the working fluid upon the turbine 106 is made greater by having high-pressure carbon dioxide ($CO_2$) gas above the working fluid in the upper tank 212 pushing downward against the surface of the fluid. In addition to this, the vacuum stored in the lower tank 214 (which was created during the charging cycle) draws on the working fluid and thus adds additional energy to propel the turbine 106 and its attached electrical generator 108. As such, the system 200 provides energy in three different but synchronous manners: (1) $CO_2$ pressure from gasified SCD upon the working fluid, (2) the weight of the working fluid itself, and (3) the drawing-down of the working fluid by the vacuum within the receiving tank.

When surplus energy from the Grid 104 is available, the charging of the pumped glycerol battery (PGB) 102 is effected by pumping the working fluid from the lower (receiving) tank 214 (#2) to the upper storage tank 212 (#1) in order to gain gravitational potential energy from the weight of the fluid. In so doing, the electricity from the Grid 104 also pushes the gaseous $CO_2$ residing above the working fluid within the upper tank 212, as the working fluid level rises, back into the $CO_2$ storage vessel 130 where it then converts back to SCD and awaits another energy discharge cycle. A compressor may be added to the system in order to accelerate the compression of the $CO_2$ back into its own SCD storage vessel 130.

While other battery systems have been proposed to store excess electrical energy by compressing $CO_2$ into a supercritical liquid or $sCO_2$ state, the pumped glycerol battery (PGB) 202 of the present disclosure utilizes the physical phase-change of $CO_2$ (liquid/$sCO_2$ to gas) for a purpose other than for the $CO_2$ gas to be the working fluid that drives the turbine 106 and its attached generator 108. In the PGB system 202, the liquid-to-gas $CO_2$ pair serves as a self-regulating provider of constant pressure applied upon the primary liquid working fluid (glycerol). Because a lowering of the stored glycerol in the upper tank 212, as it is used, creates an expansion of the space above for more of the pressure-providing $CO_2$, the $CO_2$'s pressure will accordingly drop within the $sCO_2$ tank 130; and that in turn will cause more of the $sCO_2$ to instantly change phase from "liquid" to gas, thereby restoring the desired pressure of the $CO_2$ gas against the glycerol fluid residing in the upper tank 212 (#1). Though this action is naturally fast and unassisted, a controllable electric-heater element imbedded within the "liquid" $sCO_2$ inside the $sCO_2$ tank 130 can also be used to force the change from $sCO_2$ to $CO_2$ gas and thusly create additional $CO_2$-pressure on the glycerol when needed.

The pumped glycerol battery (PGB) system 202 is comparatively space-conserving, as the glycerol remains very dense after coursing through the turbine-generator 106, 108 and accordingly does not require a large external receiving bag, as found in other systems where their expanded $CO_2$ (working-fluid) must be collected and stored in a very large, flexible low-pressure vessel until such gas is recompressed into high-pressure tanks for storage as a liquid. The PGB system 202 is very energy dense in its design because it employs two different working media that are additive in delivering pressurized working fluid to the turbine-generator 106, 108. In this, the glycerol itself will store considerable potential energy (gravitational) within the elevated upper storage tank proportional to its volume; while in addition to this, the PGB's "liquid" $CO_2$ ($sCO_2$) also stores potential energy densely as a "liquid" that can phase-change into high pressure gas. Together, both the glycerol's own weight and the $CO_2$'s high-pressure (pushing down on the glycerol from above) add up to a very high pressure working fluid going into the turbine 106, which means a smaller amount of working fluid is needed to generate an equivalent output of electricity.

The above-described energy storage system 200, including the illustrative pumped glycerol battery 202, has numerous potential advantages. For one, if glycerol proves adequate as the preferred working fluid, then cost savings and availability will be benefits. Glycerol is presently produced in large quantities as a by-product of converting soybeans into biodiesel. Because of this, the market supply of glycerol greatly exceeds the market demand for this substance, which can be readily produced in the United States without any dependence upon foreign supply chains. Likewise, the steel pipes and tanks can all be fabricated within North America, yielding local jobs and enhanced national security. It should be noted that in the closed-loop PGB system, replenishment of the primary working fluid (glycerol) may not be required even after many charge-discharge cycles. However, protection of this medium might require a separating diaphragm to block $CO_2$ from dissolving into the medium, or to block organisms than can attack the glycerol molecules.

Another benefit of the illustrative energy storage system 200 is the lack of risk of fire (as opposed to Lithium batteries) or toxicity from any fugitive leakage of media from the PGB site. Another advantage is the lack of any high-temperature storage (e.g., white hot media) of questionable efficiency and safety. Lastly, a PGB site may be located nearly anywhere, on the Grid or not, and possibly in closed-down coal-fired power plants which already have existing ties to the National Grid. In this latter aspect, the PGB system may accelerate the closing of polluting coal-fired generation units that are being retained solely to guarantee a stable Grid, and it may simultaneously encourage further development of wind and solar farms that will be made more economical due to the PGB's improvement to their off-peak markets.

Although the invention has been described in detail with reference to certain preferred embodiments, variations and modifications exist within the spirit and scope of the invention as described and defined in the following claims.

The invention claimed is:

1. An energy storage system comprising:
   a supply vessel including a first portion receiving a pressurized carbon dioxide gas, and a second portion receiving a working fluid, the first portion positioned above the second portion wherein the pressurized gas is separated from the working fluid;
   a receiving vessel in fluid communication with the supply vessel;
   a turbine positioned intermediate the supply vessel and the receiving vessel, the working fluid passing through the turbine to generate electricity; and
   a pressure vessel receiving a pressurized fluid and in fluid communication with the first portion of the supply vessel to maintain a constant pressure on the working fluid in the second portion of the supply vessel.

2. The energy storage system of claim 1, wherein the pressurized gas comprises carbon dioxide, and the working fluid comprises glycerol.

3. The energy storage system of claim 1, wherein the turbine activates a generator for dispatching power to a power grid in a first mode, and the generator acts as a motor for driving the turbine in a second mode.

4. The energy storage system of claim 1, wherein the supply vessel comprises a sealed tank.

5. The energy storage system of claim 4, wherein the first portion of the supply vessel is positioned above the second portion of the supply vessel, and a movable diaphragm is positioned between the first portion and the second portion.

6. The energy storage system of claim 1, wherein the receiving vessel is configured to receive working fluid from the turbine.

7. The energy storage system of claim 6, wherein the receiving vessel comprises a vacuum sealed tank.

8. The energy storage system of claim 1, further comprising a working fluid pump configured to pump working fluid from the receiving vessel to the second portion of the supply vessel.

9. An energy storage system comprising:
   a supply vessel including a first portion receiving a pressurized carbon dioxide, and a second portion receiving a working fluid;
   a receiving vessel in fluid communication with the supply vessel;
   a turbine positioned intermediate the supply vessel and the receiving vessel, the working fluid passing through the turbine to generate electricity; and
   a pressure vessel receiving a pressurized fluid and in fluid communication with the first portion of the supply vessel to maintain a constant pressure on the working fluid in the second portion of the supply vessel.

10. The energy storage system of claim 9, wherein the pressurized fluid in the pressure vessel comprises a supercritical carbon dioxide.

11. The energy storage system of claim 10, further comprising a heater in thermal communication with the pressure vessel.

12. The energy storage system of claim 11, further comprising a super capacitor or battery in electrical communication with the heater.

13. An energy storage system comprising:
   a supply vessel including a first portion receiving a pressurized carbon dioxide, and a second portion receiving a working fluid;

a receiving vessel in fluid communication with the supply vessel;

a turbine positioned intermediate the supply vessel and the receiving vessel, the working fluid passing through the turbine to generate electricity;

a generator operably coupled to the turbine, wherein in a first mode the generator generates electricity, and in a second mode the generator drives the turbine to pump the working fluid; and a pressure vessel receiving a pressurized fluid and in fluid communication with the first portion of the supply vessel to maintain a constant pressure on the working fluid in the second portion of the supply vessel.

14. An energy storage system comprising:

a supply vessel including a first portion receiving a pressurized carbon dioxide, and a second portion receiving a working fluid;

a receiving vessel in fluid communication with the supply vessel;

a turbine positioned intermediate the supply vessel and the receiving vessel, the working fluid passing through the turbine to generate electricity;

a pressure vessel receiving a pressurized fluid and in fluid communication with the first portion of the supply vessel to maintain a constant pressure on the working fluid in the second portion of the supply vessel; and a generator operably coupled to the turbine, wherein in a first mode the generator generates electricity, and in a second mode the generator drives the turbine to pump the working fluid.

15. The energy storage system of claim 14, wherein the working fluid comprises glycerol, and the pressurized fluid in the pressure vessel comprises a supercritical carbon dioxide.

16. A method of storing electricity comprising the steps of:

providing a supply vessel including a first portion receiving a pressurized gas, and a second portion receiving a working fluid, the first portion positioned above the second portion such that the pressurized gas is separated from the working fluid;

flowing the working fluid through a turbine to generate electricity;

using the pressurized gas to push the working fluid from the supply vessel to the turbine;

providing a receiving vessel to receive the working fluid after flowing through the turbine; and maintaining constant pressure on the working fluid in the second portion of the supply vessel.

17. The method of claim 16, wherein the working fluid comprises glycerol.

18. The method of claim 16, wherein the pressurized fluid comprises carbon dioxide gas.

19. The method of claim 16, wherein the turbine acts as a generator for dispatching power to a power grid in a first mode, and the generator acts as a motor for driving the turbine in a second mode.

20. The method of claim 16, wherein the supply vessel includes a first portion receiving the pressurized gas, and a second portion receiving the working fluid.

* * * * *